(12) United States Patent
Lee et al.

(10) Patent No.: US 7,974,263 B2
(45) Date of Patent: Jul. 5, 2011

(54) APPARATUS AND METHOD FOR TRANSMITTING/RECEIVING TIME INFORMATION IN MOBILE COMMUNICATION SYSTEM

(75) Inventors: Sang-Hyun Lee, Seoul (KR); Yoon-Suk Choi, Daejeon (KR); Jung-Eun Kim, Seoul (KR)

(73) Assignee: Samsung Electronics Co., Ltd (KR)

( * ) Notice: Subject to any disclaimer, the term of this patent is extended or adjusted under 35 U.S.C. 154(b) by 1073 days.

(21) Appl. No.: 11/753,234

(22) Filed: May 24, 2007

(65) Prior Publication Data
US 2007/0291731 A1  Dec. 20, 2007

(30) Foreign Application Priority Data
Jun. 13, 2006 (KR) .................. 10-2006-0052824

(51) Int. Cl.
H04J 3/06 (2006.01)
H04B 7/212 (2006.01)
H04M 3/00 (2006.01)
H04M 1/00 (2006.01)

(52) U.S. Cl. ........ 370/350; 370/321; 370/324; 455/418; 455/550.1

(58) Field of Classification Search .................. 370/321, 370/324, 350; 455/418, 419, 456.1, 466, 455/502, 422.1, 423, 550.1
See application file for complete search history.

(56) References Cited

U.S. PATENT DOCUMENTS

| | | | |
|---|---|---|---|
| 5,363,377 A | 11/1994 | Sharpe | |
| 6,118,827 A * | 9/2000 | Wynn | 375/273 |
| 6,452,914 B2 | 9/2002 | Niemela | |
| 7,006,834 B2 | 2/2006 | Gaal et al. | |
| 2003/0040869 A1 * | 2/2003 | Nir et al. | 701/214 |
| 2005/0147080 A1 * | 7/2005 | Haefner et al. | 370/350 |

FOREIGN PATENT DOCUMENTS

| | | |
|---|---|---|
| CN | 1411673 | 4/2003 |
| CN | 1606840 | 4/2005 |
| EP | 1 143 640 | 10/2001 |
| KR | 1020000044264 | 7/2000 |
| KR | 1020040076533 | 9/2004 |
| KR | 1020050008478 | 1/2005 |
| KR | 1020050073802 | 7/2005 |
| WO | WO 00/10028 | 2/2000 |
| WO | WO 00/38354 | 6/2000 |
| WO | WO 01/31797 | 5/2001 |
| WO | WO 02/061973 | 8/2002 |
| WO | WO 03/038466 | 5/2003 |
| WO | WO 2006/000981 | 1/2006 |

* cited by examiner

*Primary Examiner* — George Eng
*Assistant Examiner* — Marcos L Torres
(74) *Attorney, Agent, or Firm* — The Farrell Law Firm, P.C.

(57) ABSTRACT

Provided is an apparatus and method for transmitting/receiving time information in a mobile communication system. In a method for calculating a current time in the mobile communication system, time information is received from a base station. Date information and parameters for calculation of time are obtained on the basis of the received time information. A lapse time length from a reference time is calculated on the basis of the parameters. A current time is calculated using the calculated lapse time length and the date information. The time information is periodically transmitted and received using the idle frame of an idle state and the stealing flag of a normal burst contained in a BCCH.

12 Claims, 11 Drawing Sheets

FIG. 1

| 210 | 220 | 240 | 260 | 270 | 280 |
|---|---|---|---|---|---|
| T 3 | CODED DATA 39 | SYNCHRONIZATION SEQUENCE 64 | CODED DATA 39 | T 3 | GP 8.25 |

FIG.2

| F 0 | S 1 | BCCH 2-5 | CCCH 6-9 | F 10 | S 11 | CCCH 12-19 | F 20 | S 21 | CCCH 22-29 | F 30 | S 31 | CCCH 32-39 | F 40 | S 41 | CCCH 42-49 | I 50 |

APPARATUS AND METHOD FOR TRANSMITTING/RECEIVING TIME INFORMATION IN MOBILE COMMUNICATION SYSTEM

PRIORITY

This application claims priority under 35 U.S.C. §119 to an application filed in the Korean Intellectual Property Office on Jun. 13, 2006 assigned Serial No. 2006-52824, the contents of which are incorporated herein by reference.

BACKGROUND OF THE INVENTION

1. Field of the Invention

The present invention relates generally to a mobile communication system, and in particular, to an apparatus and method for transmitting/receiving time information in an idle state in a GSM (Global System for Mobile Communications) communication system by using an idle frame or a stealing flag of a normal burst contained in a Broadcast Control CHannel (BCCH).

2. Description of the Related Art

In general, transmission/reception of time information in mobile communication systems is performed differently depending on the types of access schemes used, such as CDMA (Code Division Multiple Access) and GSM.

In a CDMA communication system, base stations acquire synchronization using a Global Positioning System (GPS) and transmit time information received from the GPS to portable terminals, thereby completing time setting without users' intervention. That is, the CDMA portable terminals can keep accurate time even without users' intervention for time setting.

However, a GSM communication system does not use the GPS. Therefore, in the GSM communication system, time setting in a GSM portable terminal is performed by a user's intervention or by using time information received from a network, and a built-in Real-Time Clock (RTC) is used to maintain the time setting when the GSM portable terminal is turned off. However, the time setting using the built-in RTC is low in reliability. Thus, unlike the CDMA communication system, the GSM communication system requires time correction.

In an optional method, a dedicated channel is used to transmit time information from the GSM network to the GSM portable terminal. The optional method uses an optional message, such as mobility management information message, for transmission of the time information. The optional message is not necessarily to be transmitted from the network, and the dedicated channel causes overhead to the network.

What is therefore required is an apparatus and method that can keep accurate time without causing overhead to the network.

SUMMARY OF THE INVENTION

An object of the present invention is to substantially solve at least the above problems and/or disadvantages and to provide at least the advantages below. Accordingly, an object of the present invention is to provide an apparatus and method for keeping accurate time in the GSM communication system without causing overhead to the GSM network.

Another object of the present invention is to provide an apparatus and method for transmitting/receiving time information in the GSM communication system by using an idle frame or a stealing flag of a normal burst contained in a BCCH.

A further object of the present invention is to provide an apparatus and method for keeping accurate time information in the GSM communication system by periodic transmission/reception of time information.

According to one aspect of the present invention, a method for calculating a current time in a mobile communication system includes receiving time information from a base station; obtaining date information and parameters for calculation of time on the basis of the received time information; calculating a lapse time from a reference time on the basis of the parameters; and calculating a current time using the calculated lapse time and the date information.

According to another aspect of the present invention, a method for transmitting time information in a mobile communication system includes receiving time information; and transmitting the time information using a stealing flag of a normal burst contained in a BCCH of a signaling frame structure.

According to a further aspect of the present invention, an apparatus for calculating a current time in a mobile communication system includes a controller for providing time information received through a receiver to a time information parameter calculator; and the time information parameter calculator for calculating a current time in response to a command of the controller and providing the calculated current time to the controller.

According to further another aspect of the present invention, an apparatus for transmitting time information in a mobile communication system includes a controller for providing a time received through a receiver to a time information calculator to convert the time into time information; and the time information calculator for converting the time provided by the controller into the time information in response to a command of the controller.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

Hereinafter, an apparatus and method for transmitting/receiving time information in the GSM communication system according to the present invention will be described in detail.

Unlike the CDMA communication system, the GSM communication system uses a Time Division Multiple Access (TDMA) scheme in which time is divided into a plurality of time slots to be allocated to users.

In the GSM communication system, it takes 4.615 ms to transmit or receive one frame. That is, one TX or RX frame has a length of 4.615 ms. One frame is divided evenly into 8 bursts and thus one burst has a length of 576.9 μs.

There are four types of bursts in the GSM communication system. The four types of bursts are a normal burst, a random access burst, a frequency correction burst, and a synchronization burst. The normal burst is intended for general use. The random access burst is used for initial access of a portable terminal. The frequency correction burst is transmitted from a base station to the portable terminal so that the portable terminal acquires frequency synchronization with the base station. The synchronization burst is transmitted from the base station to the portable terminal and contains information for demodulation and decoding in the portable terminal.

Figure 1:
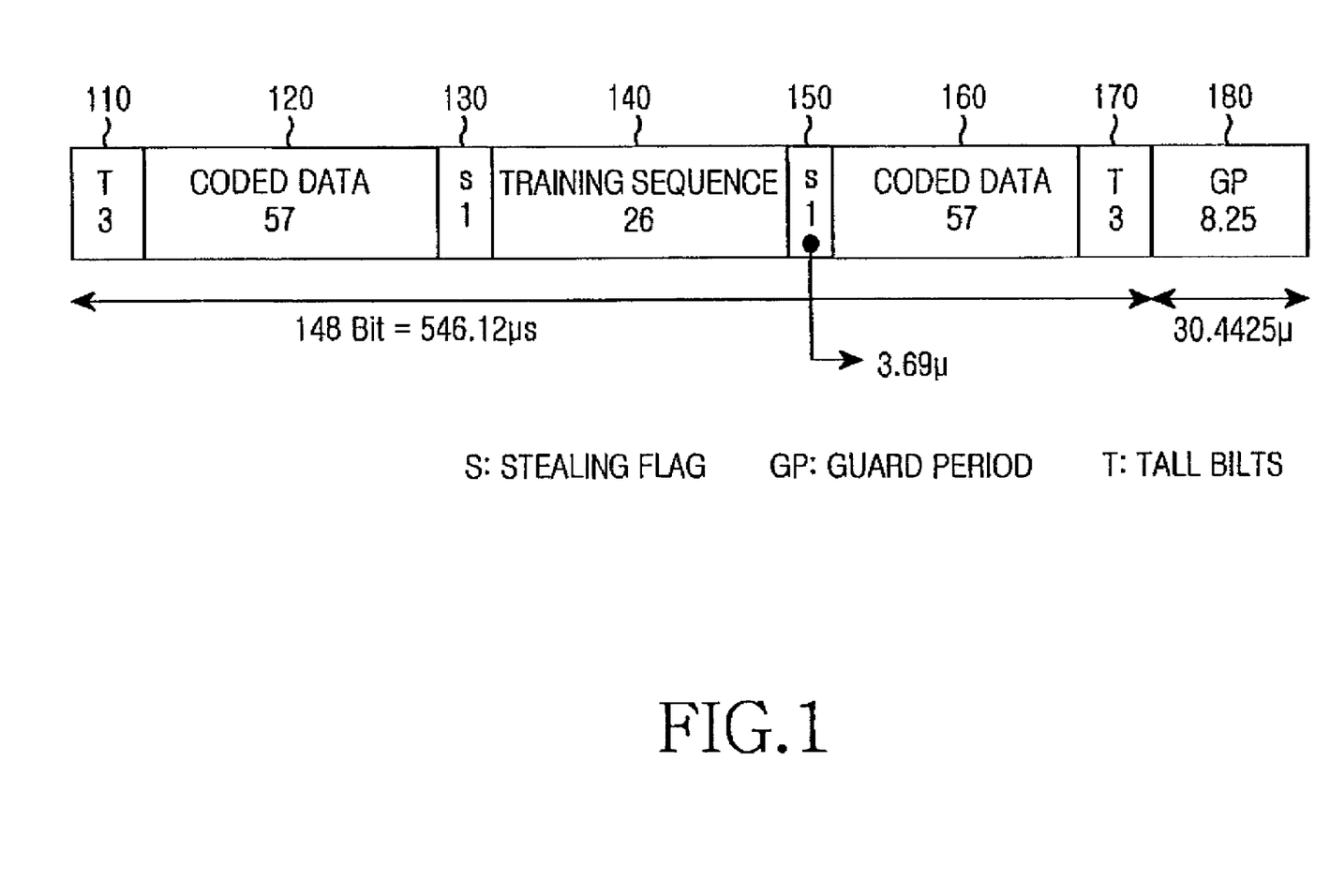
FIG. 1 is a diagram illustrating the structure of a normal burst according to the present invention.

FIG. 1 is a diagram illustrating the structure of a normal burst according to the present invention.

Referring to FIG. 1, the normal burst has a length of 148 bits. Each of tail bits 110 and 170 has a length of 3 bits and is used to discern the start and the end of the burst, respectively. Each of coded data 120 and 160 has a length of 57 bits and contains actual data. Each of stealing flags 130 and 150 has a length of 1 bit and indicates whether the normal burst is a signal burst or a data burst.

When information of a BCCH is transmitted in the GSM communication system, stealing flags 130 and 150 are normally unused (unnecessary). According to the present invention, stealing flags 130 and 150 of the normal burst in the BCCH are used for transmission of time information.

Training sequence 140 is used for synchronization. Training sequence 140 has a length of 26 bits and is constructed in a sequence that is negotiated between the base station and the portable terminal.

Guard period 180 is intended for smooth transmission/reception of the normal burst and does not contain actual data.

Information of a synchronization burst is used to obtain a frame number so that a portable terminal can detect the location of the normal burst in a frame that carries time information.

Figure 2:
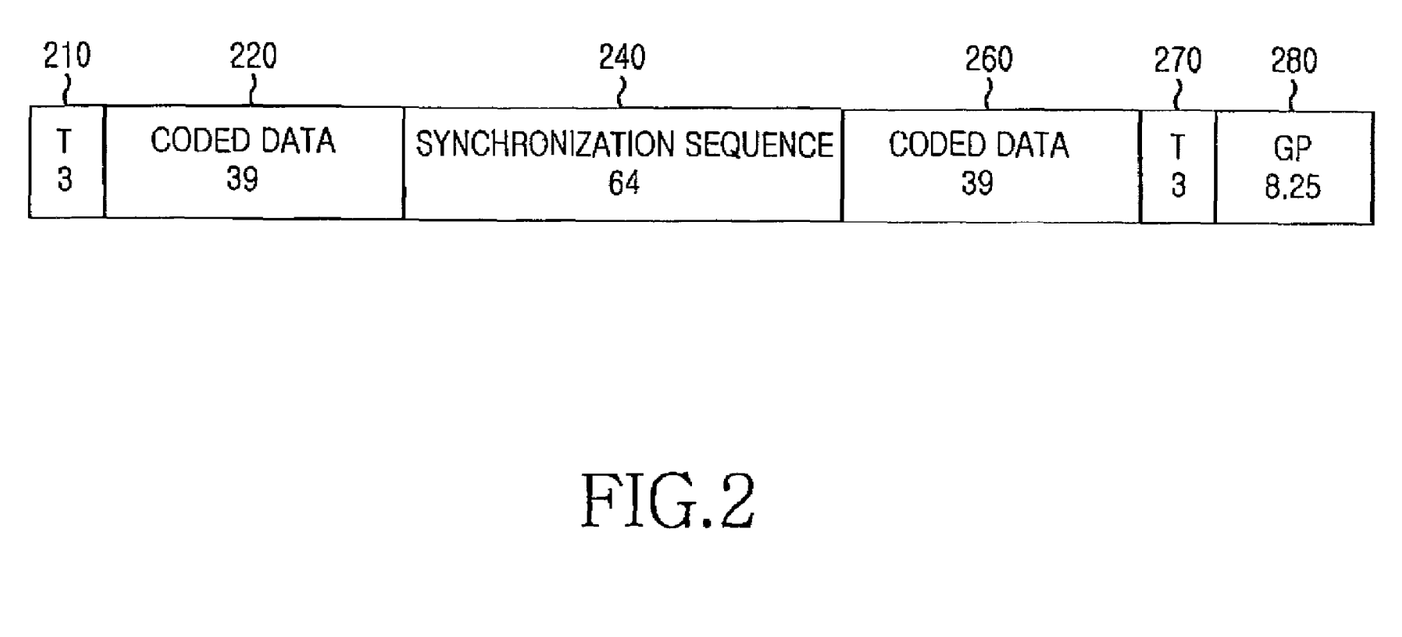
FIG. 2 is a diagram illustrating the structure of a synchronization burst according to the present invention.

FIG. 2 is a diagram illustrating the structure of a synchronization burst according to the present invention. The synchronization burst is used to transmit information of a Synchronization CHannel (SCH) in the GSM communication system.

Referring to FIG. 2, the synchronization burst has a length of 148 bits. Each of tail bits 210 and 270 has a length of 3 bits and is used to discern the start and the end of the burst, respectively. Each of coded data 220 and 260 has a length of 39 bits and contains actual data. Synchronization sequence 240 has a length of 64 bits and is used for synchronization.

Guard period 280 is intended for smooth transmission/reception of the normal burst and does not contain actual data.

The frame number illustrated in FIG. 1 and a Base Station Identity Code (BSIC) are contained in coded data 220 and 260.

The BCCH of the normal burst containing the time information and the SCH of the synchronization burst containing the frame number are contained in a signaling frame structure. The signaling frame structure includes 51 frames, while a data frame structure or a traffic frame structure includes 26 frames.

Figure 3:
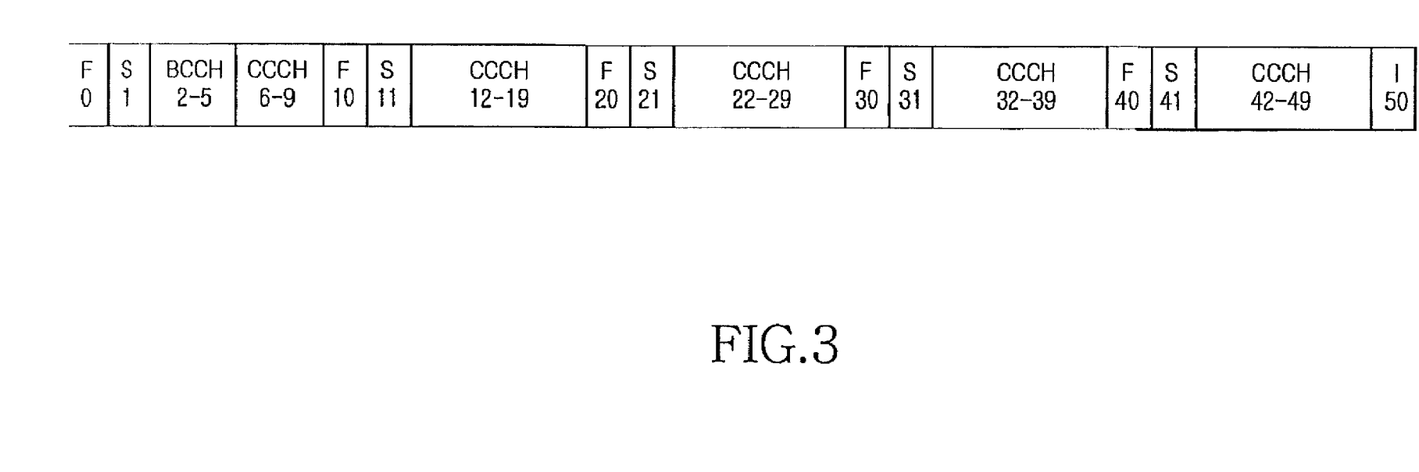
FIG. 3 is a diagram illustrating the structure of a signaling frame according to the present invention.

FIG. 3 is a diagram illustrating the structure of a signaling frame according to the present invention. There are four types of signaling frame structures and three types of data frame structures in the GSM communication system. The signaling frame structures are classified according to the channel combination structures thereof.

The signaling frame structure of FIG. 3 corresponds to combination structure 4. Referring to FIG. 3, "F", "S", "BCCH", and "CCCH" are Frequency Correction CHannel (FCCH), Synchronization CHannel (SCH), Broadcast Control CHannel, and Common Control CHannel, respectively.

Time information according to the present invention is contained in a stealing flag of a normal burst in a BCCH frame. In case of one terminal, the terminal can receive one normal burst in the BCCH frame, and 2 bits are allocated to the normal burst as the stealing flag. Because the number of BCCH frames is 4, 8 (=2×4) bits can be used for each frame for transmission/reception of time information.

The portable terminal can transmit and receive time information using an idle frame that is the last frame. The time information is contained in an idle state.

For conformity in count value, the 51 frames of the signaling frame structure and the 26 frames of the traffic frame structure need a count value of a frame structure corresponding to the least common multiple (LCM) of 1,326 (=26×51).

That is, after 1,326 frames, each count value is reset to "0." A superframe is composed of 1,326 frames and 2,048 superframes constitute a hyperframe. Thus, a hyperframe equals 2,715,648 (=2048×1326) frames.

Figure 4:
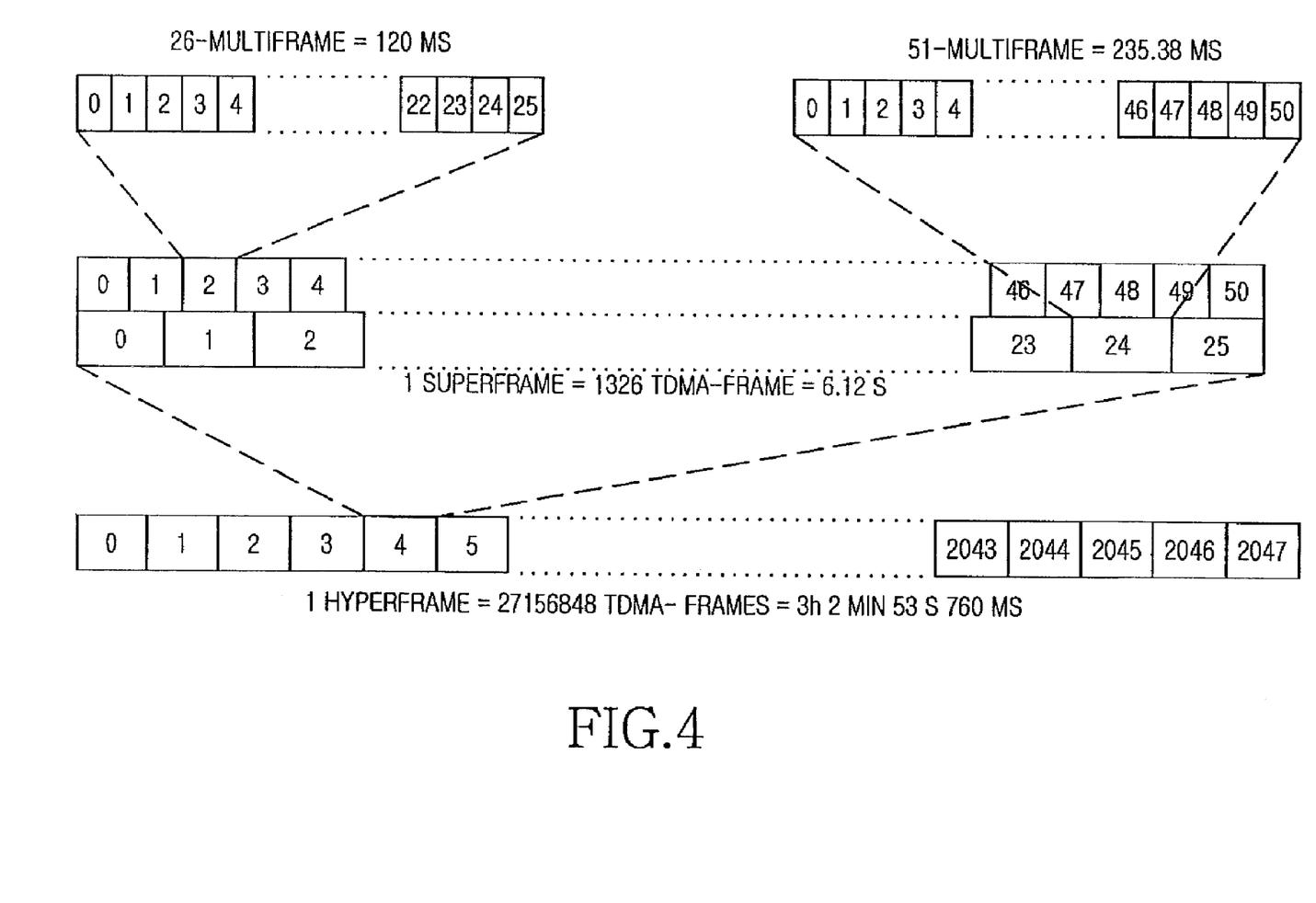
FIG. 4 is a diagram illustrating the structures of and the relationship among a traffic frame, a signaling frame, a superframe, and a hyperframe according to the present invention.

FIG. 4 is a diagram illustrating the structures of and the relationship among a traffic frame, a signaling frame, a superframe, and a hyperframe according to the present invention.

Referring to FIG. 4, the signaling frame has a time length of 120 ms and the traffic frame has a time length of 235.38 ms. The superframe has a time length of 6.12 seconds, and the hyperframe has a time length of 3 h 2 m 53 s 760 ms.

Figure 5:
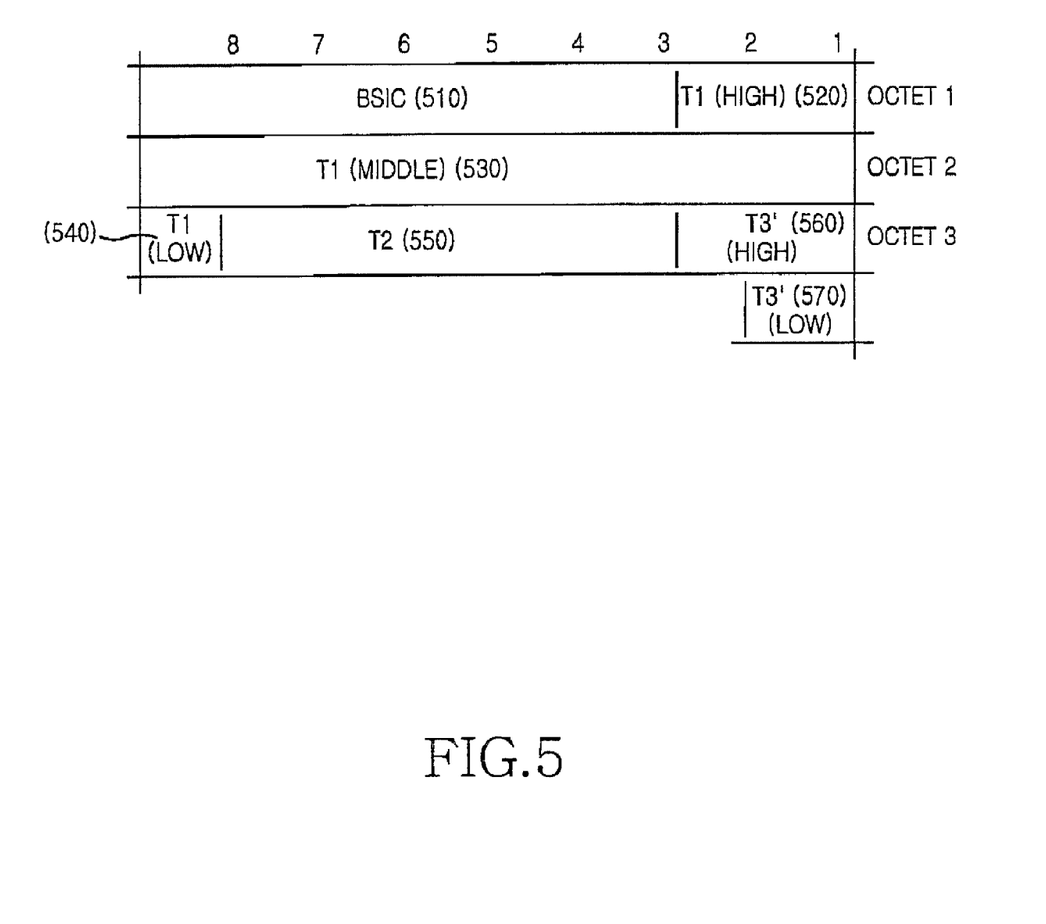
FIG. 5 is a diagram illustrating parameters for obtaining a frame number according to the present invention.

FIG. 5 is a diagram illustrating parameters for obtaining the frame number according to the present invention.

FIG. 5 illustrates information elements that are contained in the synchronization burst of a synchronization channel, which will be used for the following description. Referring to FIG. 5, BSIC (510) indicates an identity code of a base station that is used as a base station identifier. T1 (520, 530, 540) indicates a frame count of a superframe. T2 (550) indicates a frame count of a traffic frame structure. Although not illustrated in FIG. 5, T3 indicates a frame count of a signaling frame structure. T3 can be obtained by substituting T3' (560, 570) in Equation (1):

$$T3 = (10 \times T3') + 1 \tag{1}$$

The frame number can be obtained by substituting T1, T2 and T3 in Equation (2):

$$\text{Frame Number (FN)} = 51 \times ((T3 - T2) \bmod 26) + T3 + 51 \times 26 \times T1 \tag{2}$$

where if $(T3-T2)<0$, $(26-(T3-T2))$ is used instead of $(T3-T2)$.

The mobile terminal can obtain the current frame count value from the synchronization burst in the synchronization channel of FIG. 2.

The maximum value of the frame number is the number of frames in a hyperframe less 1. That is, 2,715,647=2,715,648−1. The reason for this is that the frame number starts from 0. In addition, the frame number is reset to 0 whenever the frame count of the hyperframe increases by 1. In the GSM communication system, a base station and a portable terminal use parameters termed Transaction Capabilities (TC) for mapping a frame number. In the present invention, the TC is used to determine whether transmission of time information is completed. The TC can be obtained using Equation (3):

$$TC=(\text{Frame Number}/51)\bmod 8 \qquad 3$$

In Equation (3), the result of the frame number divided by 51 equals the number of frames in the signaling frame structure. If the stealing flag is used, 8 bits may be allocated to time information for each signaling frame structure. The TC increases by 1 when 8 bits are transmitted. For example, when 64 bits are necessary for transmission of time information, if the TC value is 8, it can be seen that 64 bits are provided.

If the TC value is set as expressed in Equation (4), it increases by 1 after transmission of 16 bits.

$$TC=(\text{Frame Number}/51)\bmod 16 \qquad (4)$$

Because each of the frame structure and the frame has a characteristic length, a lapse time from a reference time (e.g., midnight) to receipt of a corresponding frame can be obtained from a frame number from which the reference time starts a frame count value of a complete hyperframe after the reference time, and the current frame number. In addition, if date information (i.e., year, month, and day) is known, complete time information can be obtained.

As described above, T1, T2 and T3 indicate the frame number from which the reference time starts. If the values of T1, T2 and T3, the frame count value, and the date information are contained in the normal burst transmitted to the portable terminal over the BCCH, the portable terminal can obtain the complete time information using the current frame number value that can be obtained from the above information and the current SCH.

A method for obtaining the compete time information will be described later with reference to FIGS. 7 and 8.

Figure 6A:
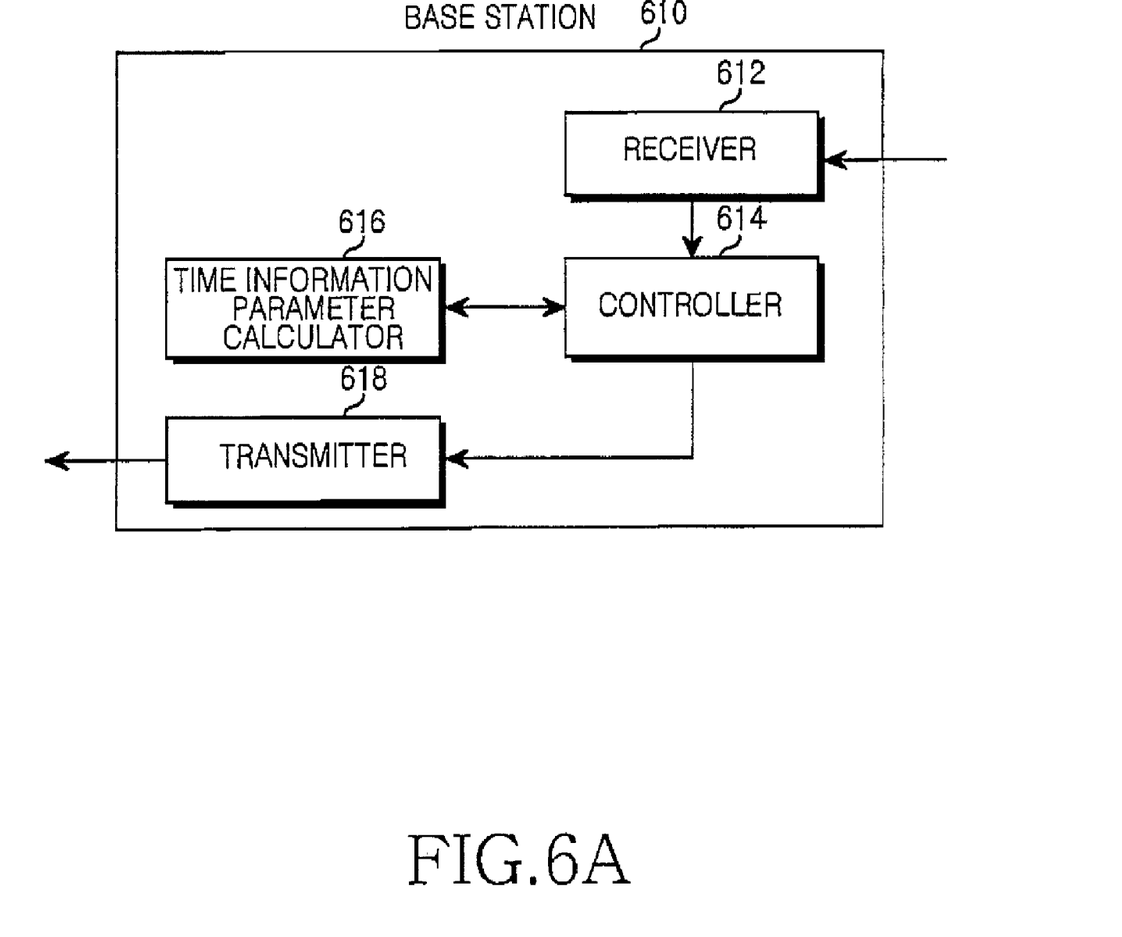
FIGS. 6A and 6B are block diagrams of a time information transmitting/receiving apparatus according to the present invention.
Figure 6B:
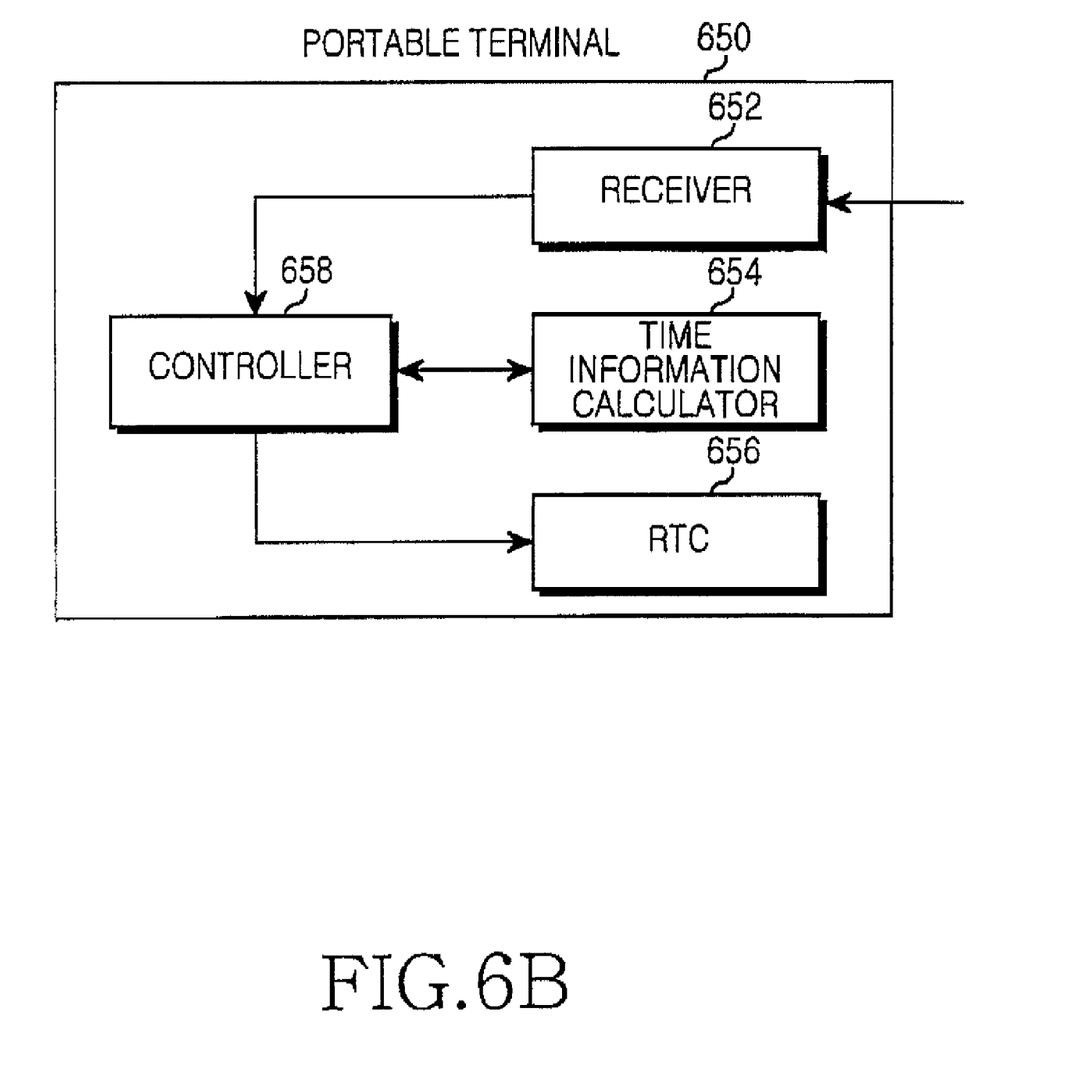

FIGS. 6A and 6B are block diagrams of a time information transmitting/receiving apparatus according to the present invention.

FIG. 6A illustrates base station 610 that transmits the time information, while FIG. 6B illustrates portable terminal 652 that receives the time information.

Referring to FIG. 6A, receiver 612 receives time information from an upper-layer network. Controller 614 provides the time information to time information parameter calculator 616. Under the control of controller 614, time information parameter calculator 616 outputs T1, T2 and T3 at the reference time, a parameter that is a count value of a complete hyperframe structure after the reference time, time information that is date information such as year, month and the outputs are transmitted by transmitter 618 over a BCCH to portable terminal 650.

Time information parameter calculator 616 calculates T1 (11 bits), T2 (5 bits) and T3 (6 bits) for indication of a frame number at the reference time on the basis of the time information received from controller 614, and provides a counter value of a complete hyperframe structure after the reference time, a year value (7 bits), a month value (4 bits) and a date value (5 bits) to controller 614.

Referring to FIG. 6B, portable terminal 650 receives the time information. Receiver 652 receives and provides time information to controller 658. Controller 658 provides the time information to time information calculator 654 to calculate a complete time. Time information calculator 654 calculates the complete time using T1, T2 and T3 for indicating a frame number at a reference time, a frame count value of a complete hyperframe structure after the reference time, date information (i.e., year, month and day), and a frame number of a current hyperframe structure in an SCH, and provides the calculated complete time to controller 658. A method for controlling the complete time will be described in detail later with reference to FIG. 8. Controller 658 inputs the received time information into Real-Time Clock (RTC) 656 for reflection.

Base station 610 updates the time information periodically or when a specific event occurs, and provides the updated time information to portable terminal 650. Portable terminal 650 receives and applies the updated time information. An example of the update of the time information is as follows.

Portable terminal 650 receives the time information from base station 610 at one reference time per day or when a reference time changes (e.g., the start and the end of daylight saving time). The time information is updated in case of a change in a region.

A method for providing the time information according to the present invention will now be described with reference to FIGS. 7 through 10.

Figure 7:
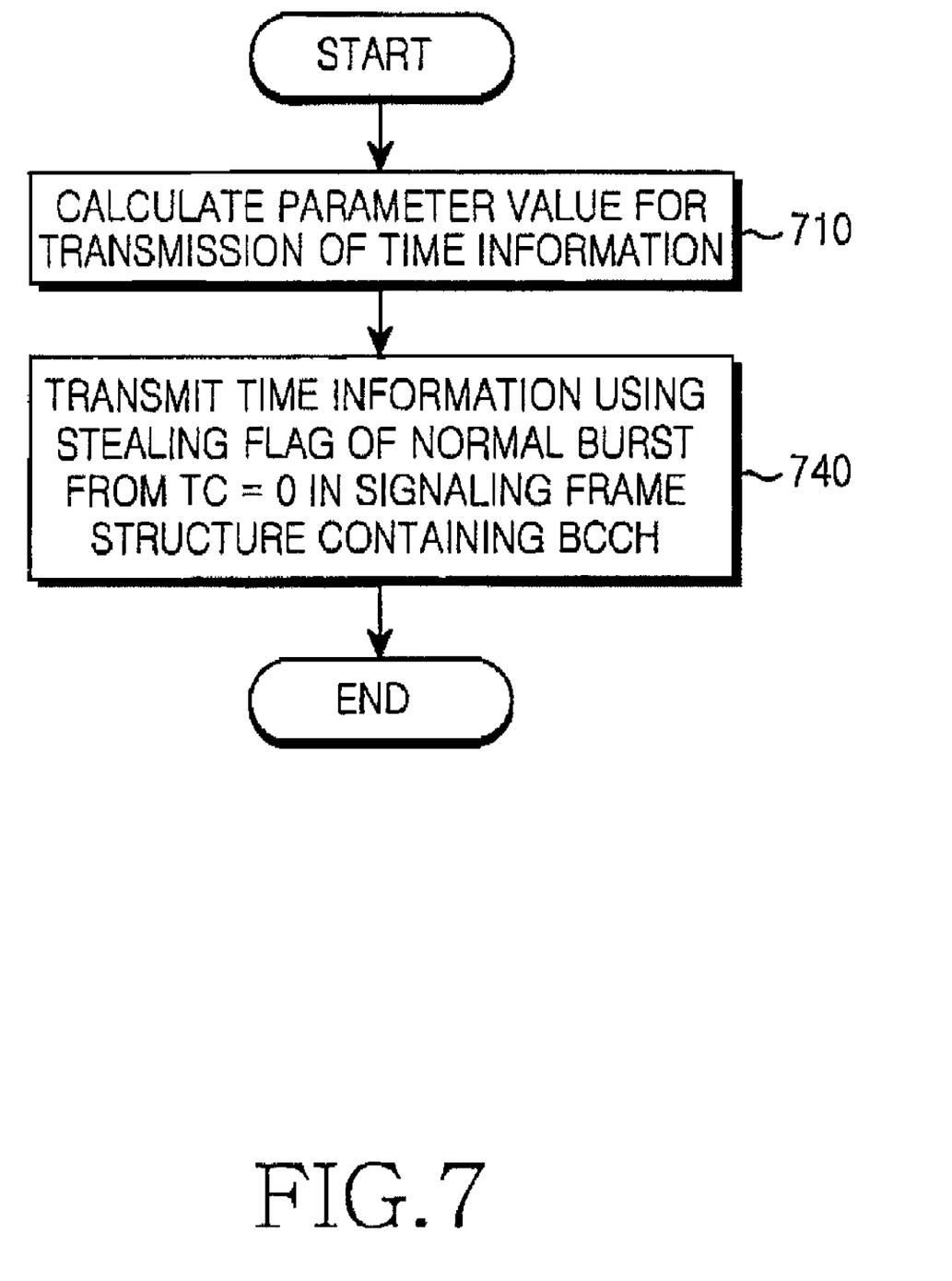
FIG. 7 is a flowchart illustrating a procedure for transmitting time information according to an embodiment of the present invention.

FIG. 7 is a flowchart illustrating a procedure for transmitting time information according to an embodiment of the present invention.

Referring to FIGS. 6A and 7, time information parameter calculator 616 calculates T1, T2 and T3 for indicating a frame number at a reference time, a frame count value of a complete hyperframe structure after the reference time, date information (i.e., year, month and day), in step 710, in response to a command of controller 614. The calculated information is provided to controller 614.

In step 740, controller 614 transmits the time information through transmitter 618 using a stealing flag of a BCCH normal burst (from TC=0 in a signaling frame structure containing the BCCH). A plurality of signaling frames may be required depending on the length of the time information. As expressed in Equation (3) or (4), the portable terminal can detect the time of completion of the reception of the time information using specific mapping parameters.

Figure 8:
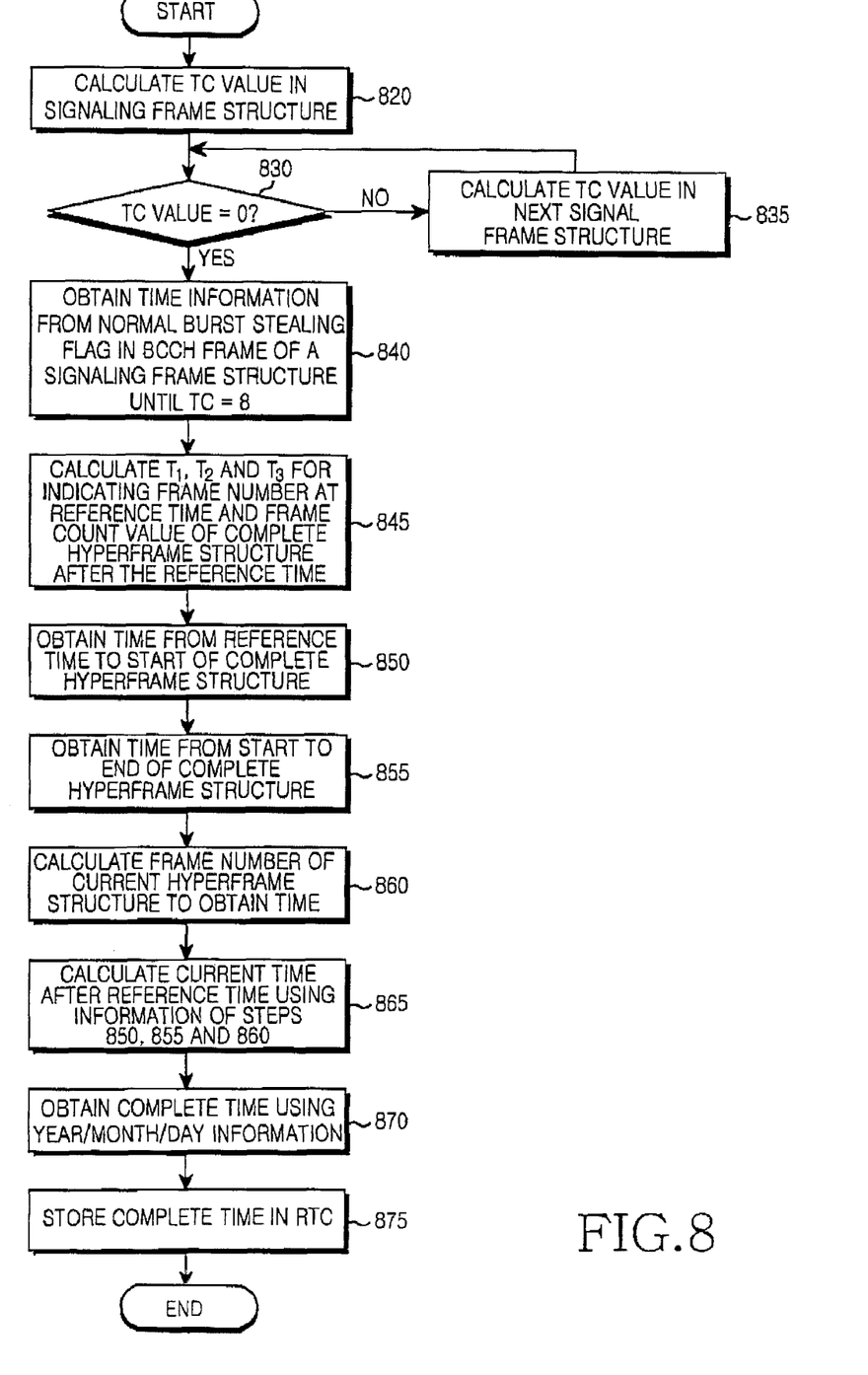
FIG. 8 is a flowchart illustrating a procedure for receiving time information according to an embodiment of the present invention.

FIG. 8 is a flowchart illustrating a procedure for receiving time information according to an embodiment of the present invention.

Referring to FIGS. 6B and 8, controller 658 of portable terminal 650 calculates a TC value from a received signaling frame structure in step 820.

In step 830, controller 658 determines if the TC value is 0. If so, the procedure proceeds to step 840; and if not, the procedure proceeds to step 835. In step 835, controller 658 calculates a TC value from the next signaling frame structure and then the procedure returns to step 830.

In step 840, controller 658 obtains time information from a normal burst stealing flag in a BCCH frame of a signaling frame structure (until TC=8) and provides the obtained time information to time information calculator 654. The TC value may vary depending on the size of the time information.

In step 845, time information calculator 654 calculates T1, T2 and T3 for indicating a frame number at a reference time, a frame count value of a complete hyperframe structure after the reference time, and date information (i.e., year, month and day) on the basis of the time information.

In step 850, time information calculator 654 calculates the time from the time information to the start of the complete hyperframe structure. The time from the time information to the start of the complete hyperframe structure can be calculated as follows.

First, T1, T2 and T3 values among the time information are used to calculate a frame number corresponding to the start of a reference time. The maximum value of the frame number is 2,715,647, which is the number of frames in a hyperframe less 1. The value of the frame number corresponding to the start of the reference time is subtracted from the maximum value. The value of the subtraction result is multiplied by the time length of one frame (4.615 ms), thereby obtaining the time from the reference time to the start of the first complete hyper structure.

In step 855, time information calculator 654 calculates the time from the start to the end of the complete hyperframe. The time from the start to the end of the complete hyperframe can be calculated as follows.

A count value of the complete hyperframe structure after the reference time is multiplied by the time length of the hyperframe (3 h 2 m 53 s 760 ms), thereby obtaining the time from the start to the end of the complete hyperframe structure.

In step 860, time information calculator 654 calculates a frame number in the current hyperframe structure to obtain a time from the end of the complete hyperframe structure to a current time. There is a difference between step 850 and step 860 in calculating the frame number in the current hyperframe structure. That is, step 850 uses a received T3 value, while step 860 uses Equation (1) to calculate a T3 value from a T3' value.

The frame number in the current hyperframe structure can be obtained from a synchronization burst of an SCH.

That is, the current frame structure is obtained from the current hyperframe structure and the resulting value is multiplied by a frame time length, thereby obtaining the time from the end of the complete hyperframe structure to the current time.

In step 865, time information calculator 654 adds the times of steps 850, 855 and 860 to obtain the lapse time from the reference time.

In step 870, time information calculator 654 adds date (i.e., year, month and day) information to the lapse time to obtain the complete time.

Time information calculator 654 provides the complete time to controller 658 and controller 658 stores the complete time in the RTC, in step 875.

Figure 9:
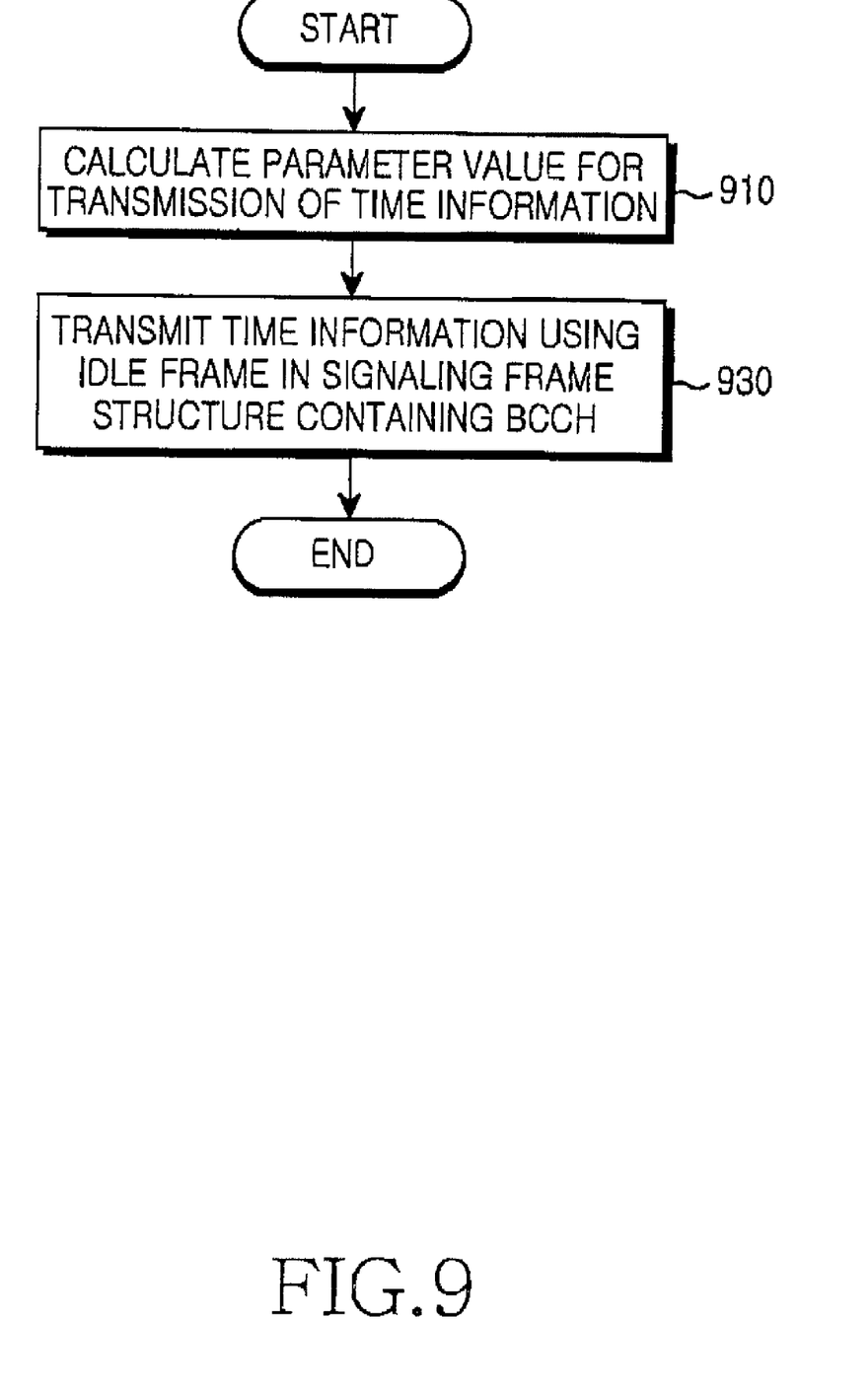
FIG. 9 is a flowchart illustrating a procedure for transmitting time information according to another embodiment of the present invention.

FIG. 9 is a flowchart illustrating a procedure for transmitting time information according to another embodiment of the present invention.

Referring to FIG. 9, time information parameter calculator 616 calculates T1, T2 and T3 for indicating a frame number at a reference time, a frame count value of a complete hyperframe structure after the reference time, date information (i.e., year, month and day), in step 910, in response to a command of controller 614. The calculated information is provided to controller 614.

In step 930, controller 614 transmits the time information through transmitter 618 using an idle flag of a signaling frame structure containing a BCCH.

Figure 10:
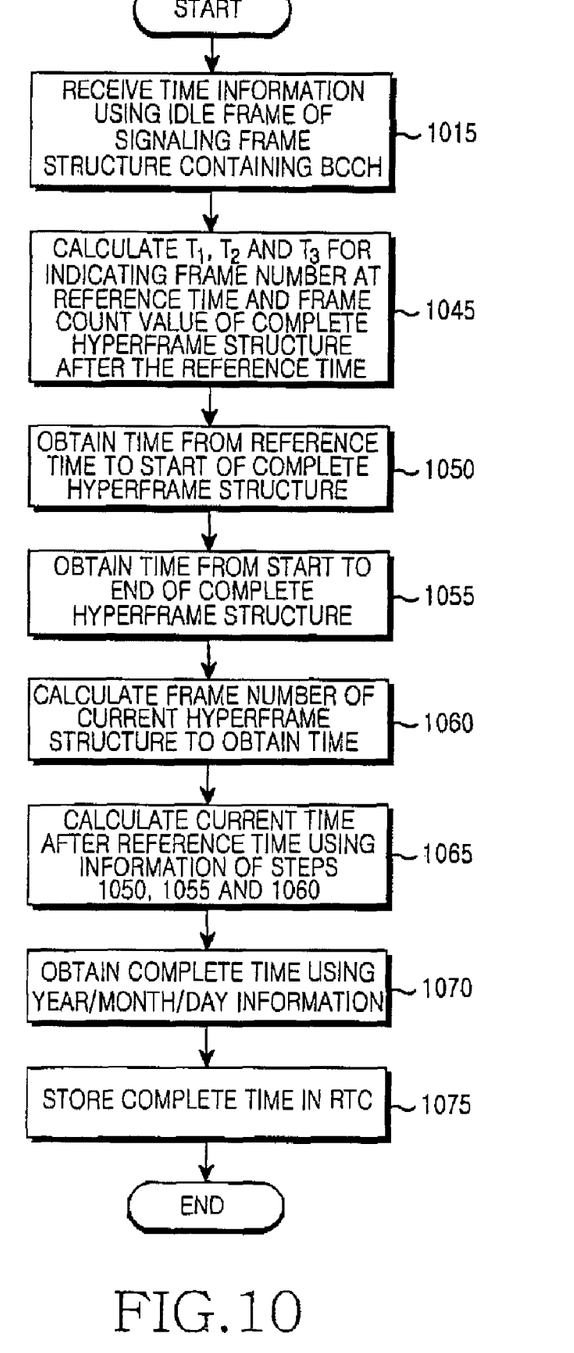
FIG. 10 is a flowchart illustrating a procedure for receiving time information according to another embodiment of the present invention.

FIG. 10 is a flowchart illustrating a procedure for receiving time information according to another embodiment of the present invention.

Referring to FIG. 10, in step 1015, controller 658 of portable terminal 650 receives time information through receiver 652 from an idle frame of a signaling frame structure and provides the time information to time information calculator 654.

Subsequent steps 1045 through 1075 are identical respectively to steps 845 through 875.

The time information transmission procedures of FIGS. 7 and 9 and the time information reception procedures of FIGS. 8 and 10 can be applied independently but cannot be applied selectively under specific conditions.

As described above, the present invention transmits and receives time information periodically using the idle frame of an idle state and the stealing flag of a normal burst contained in the BCCH (not a dedicated channel). Accordingly, it is possible to prevent overhead to the network and to maintain the accurate time information.

While the invention has been shown and described with reference to certain preferred embodiments thereof it will be understood by those skilled in the art that various changes in form and details may be made therein without departing from the spirit and scope of the invention as defined by the appended claims.

What is claimed is:

1. A method for calculating a current time in a mobile communication system, comprising the steps of:
   receiving time information transmitted from a base station;
   obtaining date information and parameters for calculation of time on the basis of the received time information;
   calculating a lapse time length from a reference time on the basis of the parameters;
   calculating a current time using the calculated lapse time length and the date information,
   wherein the time information contains T1, T2 and T3 for indicating a frame number at a reference time, a parameter that is a frame count value of a complete hyperframe structure after the reference time, and date information including year, month and day,
   wherein the step of calculating the lapse time length on the basis of the parameters comprises:
   calculating a first time length from the reference time to a start of a complete hyperframe structure on the basis of a frame number from which the reference time starts;
   calculating a second time length from the start to the end of the complete hyperframe structure;
   calculating the lapse time length from a end of the complete hyperframe structure to the current time; and
   adding the first time length, the second time length and the lapse time length, and
   wherein the step of calculating the first time length comprises:
   calculating the frame number from which the reference time starts, using the values of T1, T2 and T3 among the parameters and the following equation Frame Number (FN)=51×((T3−T2)mod 26)+T3+51× 26×T1, where if (T3−T2)<0, (26−(T3−T2)) is used instead of (T3−T2); and
   subtracting the start frame number from a maximum value of the frame number to obtain the number of frames and multiplying the obtained number by the time length of one frame.

2. The method of claim 1, further comprising storing the calculated current time in a real-time clock.

3. The method of claim 1, wherein the parameters and the date information are obtained from one of an idle frame contained in a signaling frame structure transmitted from the base station, and a stealing flag contained in a normal burst of a Broadcast Control CHannel (BCCH) frame of a signaling frame structure transmitted from the base station.

4. The method of claim 3, wherein if the parameters and the date information are obtained from the stealing flag, a parameter for mapping a frame number is used to determine whether the transmission of the time information from the base station is started/ended.

5. The method of claim 1, wherein the step of calculating the current time using the calculated lapse time length and the date information comprises applying the date information to the calculated lapse time length.

6. An apparatus for calculating a current time in a mobile communication system, comprising:
 a controller for providing time information received through a receiver to a time information parameter calculator; and
 the time information parameter calculator for calculating a current time in response to a command of the controller and providing the calculated current time to the controller,
 wherein the time information contains T1, T2 and T3 for indicating a frame number at a reference time, a parameter that is a frame count value of a complete hyperframe structure after the reference time, and date information including year, month and day,
 wherein the time information parameter calculator obtains date information and parameters for calculation of time on the basis of the received time information, calculates a lapse time length from a reference time on the basis of the parameters, and calculates the current time using the calculated lapse time length and the date information,
 wherein the time information parameter calculator calculates a first time length from the reference time to a start of a complete hyperframe structure on the basis of a frame number from which the reference time starts, calculates a second time length from the start to the end of the complete hyperframe structure, calculates the lapse time length from the end of the complete hyperframe structure to a current time, and adds the first time length, the second time length and the lapse time length, and
 wherein the time information parameter calculator calculates the frame number, from which the reference time starts, using the values of T1, T2 and T3 and the following equation Frame Number (FN)=51×((T3−T2)mod 26)+T3+51×26×T1, where if (T3−T2)<0, (26−(T3−T2)) is used instead of (T3−T2), and
 subtracts the start frame number from the maximum value of the frame number to obtain the number of frames, and multiplies the obtained number by the time length of one frame to obtain the first time length.

7. The apparatus of claim 6, further comprising a real-time clock for receiving the calculated current time that is provided by the time information parameter calculator to the controller.

8. The apparatus of claim 6, wherein the time information parameter calculator calculates the current time using the calculated lapse time length and the date information.

9. An apparatus for transmitting time information in a mobile communication system, the apparatus comprising: a controller for providing a time received through a receiver to a time information calculator; and the time information calculator for converting the time into time information in response to a command of the controller and the time information calculator calculates a first time length from a reference time to a start of a complete hyperframe structure based on a frame number from which the reference time starts, calculates a second time length from the start to an end of the complete hyperframe structure, calculates a lapse time length from the end of the complete hyperframe structure to the current time, and adds the first time length, the second time length and the lapse time length,
 wherein the time information parameter calculator calculates the frame number from which the reference time starts using an equation:
 Frame Number (FN)=51×((T3−T2)mod 26)+T3+51×26× T1, wherein if (T3−T2) 0, (26−(T3−T2)) is used instead of (T3−T2) and the start frame number is subtracted from a maximum value of the frame number to obtain a number of frames and multiplying the obtained number by a time length of one frame,
 wherein T1, T2 and T3 are contained in the time information for indicating a frame number at the reference time, a parameter that is a frame count value of the complete hyperframe structure after the reference time, and date information including year, month and day.

10. The apparatus of claim 9, further comprising a transmitter for transmitting the time information that the controller receives from the time information calculator.

11. The apparatus of claim 9, wherein the controller transmits the time information using an idle frame in a signaling frame structure if a portable terminal is in an idle state.

12. The apparatus of claim 9, wherein the controller transmits the time information using a stealing flag of a normal burst contained in a Broadcast Control CHannel (BCCH) of a signaling frame structure if a portable terminal is in an idle state.

* * * * *